United States Patent [19]

Coulombeau et al.

[11] 4,263,383
[45] Apr. 21, 1981

[54] ZINC ELECTRODE

[75] Inventors: Alain Coulombeau, La Roche Blanche; Georges Peyron, Riom, both of France

[73] Assignee: Compagnie Generale des Etablissements Michelin, Clermont-Ferrand, France

[21] Appl. No.: 58,030

[22] Filed: Jul. 16, 1979

[30] Foreign Application Priority Data

Jul. 25, 1978 [FR] France .................... 78 22199

[51] Int. Cl.³ .................... H01M 4/48; H01M 4/62
[52] U.S. Cl. .................... 429/217; 429/231; 429/232
[58] Field of Search ............ 429/229, 231, 232, 217; 252/182.1

[56] References Cited

U.S. PATENT DOCUMENTS

| 2,738,375 | 3/1956 | Schlotter | 429/217 |
| 3,137,594 | 6/1964 | Bikerman | 429/231 |
| 3,502,505 | 3/1970 | Jackson et al. | 252/182.1 |
| 3,923,544 | 12/1975 | Berchielli | 429/229 |
| 3,926,672 | 12/1975 | Curelop | 252/182.1 |
| 3,972,729 | 8/1976 | Mosetti et al. | 252/182.1 |

FOREIGN PATENT DOCUMENTS 2019715 7/1970 France .
870145 6/1961 United Kingdom .

Primary Examiner—Donald L. Walton
Attorney, Agent, or Firm—Brumbaugh, Graves, Donohue & Raymond

[57] ABSTRACT

A zinc electrode comprising at least one active portion is improved due to the fact that the active portion has an open porosity of at least 60% and comprises electron-conductive fibers and due to the fact that the active material or materials are distributed practically uniformly throughout the active portion.

10 Claims, 3 Drawing Figures

ZINC ELECTRODE

The present invention relates to electrochemical generators of electric current.

More particularly, the invention relates to the negative electrodes of these generators in which the active material upon discharge is zinc in metallic state.

It is known to make such zinc electrodes by electrolytic depositing of said metal on a metallic support serving as collector. Such an electrode is described, for instance, in U.S. Pat. No. 3,238,070.

Another method of producing these electrodes consists in applying a mixture of binder and powdered zinc or zinc oxide to a collector. French patent No. 2,264,401, for instance, describes a method of this type in which there is applied to a collector grid a nonhardened mixture comprising particulate zinc oxide, a binder, for example polytetrafluorethylene, polyvinyl alcohol, polypropylene, polyethylene or carboxymethyl cellulose, as well as other materials, for example rayon fibers or metallic powders.

The zinc electrodes prepared at the present time by these two processes are of low porosity so that the amount of electrolyte which they contain is low. Upon the electro-chemical charging of so-called secondary generators using these electrodes, the deposit of zinc metal is obtained by reduction of ions, for example zincates, which migrate towards the zinc electrode from the electrolyte located outside this electrode. The zinc then deposits in the form of dendrites whose growth takes place in a direction substantially perpendicular to the electrode. This growth can take place through separators arranged between the positive and negative electrodes and therefore produce internal short circuits. Deformations of the zinc electrode furthermore occur due, probably, to movements of the electrolyte parallel to the surface of the electrode upon the charge-discharge cycles. The life of these electrodes is considerably shortened due to these phenomena and the number of charge-discharge cycles is very few, for example on the order of a few tens.

French patent No. 1,582,503 attempts to avoid the formation of dendrites by reducing the amount of electrolyte in contact with the positive electrode, which is made very hydrophobic for this purpose. Furthermore, the negative electrode, produced by compressing zinc powder, has a porosity on the order of 55% so as to retain a substantial amount of electrolyte. Experience shows that in this case the characteristics of the positive electrode are greatly affected by its marked hydrophobic character and that the structure of the negative electrode does not make it possible substantially to inhibit the formation of the dendrites.

French patent No. 1,465,642 describes a process of producing nickel or cadmium electrodes. This process consists in chemically or electrochemically precipitating nickel or cadmium hydroxide in a felt of graphite fibers, after impregnating this felt with a solution of a nickel or cadmium salt, the porosity of which electrodes may reach 80%. This method is not applicable to zinc electrodes. As a matter of fact, the chemical or electrochemical precipitation of zinc oxide or hydroxide can be obtained only within a narrow pH range close to neutral pH. A pH gradient is necessarily established in the felt during this precipitation and therefore a heterogeneity in the distribution of the active material and thus defective operation of the zinc electrode.

The object of the present invention is to avoid the drawbacks described above.

Accordingly, the zinc electrode of the invention comprising at least one active portion is characterized by the fact that the active portion has an open porosity of at least 60% and comprises electron-conductive fibers and by the fact that the active material or materials are distributed practically uniformly throughout the active portion.

The expression "active portion" designates the portion of the zinc electrode where the electrochemical charge and discharge reactions take place, that is to say the portion where the active material or materials, namely the zinc and/or zinc oxide or hydroxide, with the conductive fibers and other possible additives are located, this portion not including the collector or collectors when the electrode contains same.

The expression "open porosity" means that the voids corresponding to this porosity communicate with each other and are therefore able to be filled with electrolyte upon the operation of the electrode. This open porosity of at least 60% corresponds to the percentage of voids with respect to the total volume of the active portion.

The invention also concerns generators which use at least one zinc electrode in accordance with the invention as well as the processes for producing this electrode.

The figures of the drawing, all of which are schematic, together with their description as well as the examples which follow are intended to illustrate the invention and to facilitate an understanding thereof without, however, limiting its scope.

A mixture is formed of 100 g of zinc oxide, ZnO, in powdered form, with 300 cc of water and 10 g of carbon fibers, the characteristics of which are as follows: minimum length 1 mm, the average length of the fibers being for example on the order of 1.5 to 5 mm; average diameter: from 5 to 20 micrometers.

The mixture is homogenized, for example by means of a turbine disperser, at ambient temperature, that is to say at about 20° C. Liquids other than water can be used for the production of the mixture, for example one or more organic liquids, in particular a hydrocarbon or a linear, cyclic, or aromatic alcohol, possibly mixed with each other and/or with water, which are inert in the presence of the various components of the mixture.

12 g of latex containing about 50% by weight of polychloroprene are then added and homogenization is again effected. A layer of this mixture is deposited in a mold. Conductive wires, for example copper wires, are applied to said layer and these wires are covered with a second layer of the mixture. The assembly thus obtained is then placed in a stove of a temperature of about 120° C. It is left in this stove for about 4 hours so as to vulcanize the polychloroprene and eliminate the water. The free portions of the copper wires are then stranded together to form the negative terminal of the zinc electrode.

The electrode thus obtained has, for instance, the following dimensions:

length and width: 6 cm
thickness: 0.28 cm.

The composition of this electrode is practically the following:

ZnO: 7.4 g
copper: 1.5 g
carbon fibers: 0.74 g
polychloroprene: 0.45 g.

Figure 1:
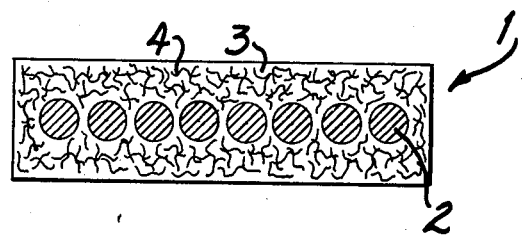
FIG. 1 shows in cross section a zinc electrode in accordance with the invention.

FIG. 1 shows schematically in cross section a width of the electrode 1 thus obtained. For the clarity of the drawing the thickness of the electrode has been substantially exaggerated as compared with the width. The electrode 1 comprises copper wires 2, for example substantially parallel to each other, contained within the active portion 3 which comprises the carbon fibers 4, as well as the particles of zinc oxide (not shown) and the vulcanized polychloroprene (not shown).

Figure 2:
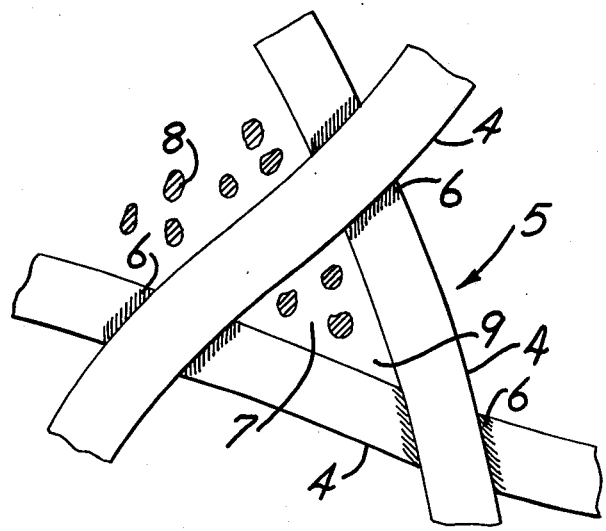
FIG. 2 shows, on a greatly enlarged scale, a portion of the zinc electrode shown in FIG. 1.

FIG. 2 shows schematically a portion 5, on a considerably enlarged scale, of the electrode 1. This portion 5 comprises carbon fibers 4 arranged at random, that is to say without preferential orientation. These fibers 4 are interlaced in the form of a felt and assembled at points due to bridges 6 of vulcanized polychloroprene. These fibers 4 which are thus assembled form a very porous structure with voids 7 communicating with each other within which there are contained the particles 8 of zinc oxide distributed substantially homogeneously. The empty portions 9 of the finished electrode communicate with each other thus forming an open porosity. This open porosity represents about 82% of the total volume of the active portion 3. This porosity is determined in known manner by impregnation with water under vacuum at 20° C. This open porosity corresponds substantially to the open porosity of the total electrode in view of the small volume occupied by the copper wires. The porosity due to the voids 7 between the carbon fibers 4 represents about 94% of the volume of the active portion 3, this porosity being determined by calculation.

Figure 3:
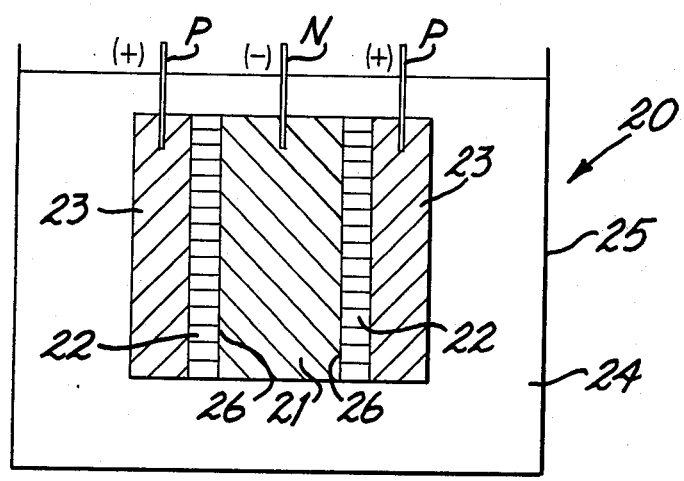
FIG. 3 shows in cross section a generator employing either a known zinc electrode or a zinc electrode in accordance with the invention.

The two nonlimitative examples which follow are intended to show the improvement in performance obtained by the zinc electrodes in accordance with the invention. These two examples are operating tests in charge-discharge cycles carried out with the generator 20 shown in FIG. 3.

This generator 20 comprises a zinc electrode 21, a separator 22 wound around said electrode 21 and two positive electrodes 23 placed against the separator 22, on both sides of the zinc electrode 21. The electrodes 21, 23 and the separator 22 are arranged vertically in an electrolyte 24 contained in a tank 25. N designates the terminal of the negative electrode 21 and P the current outlets of the positive electrodes 23, these current outlets being connected to the same positive terminal (not shown) of the generator 20.

The characteristics of the generator 20 for each of the two tests are as follows:

(a) Zinc electrode 21.

This electrode is:
either a known electrode consisting of a perforated sheet of copper serving as collector, having on each face an active mass formed, before the test, of a deposit of zinc oxide; total weight of this zinc oxide: about 7.8 g, namely practically 3.9 g for each face; porosity of this active mass: about 50% by volume; a nonwoven fabric is applied to each deposit of zinc oxide of this known electrode; this nonwoven fabric of a thickness of about 50 micrometers is very permeable to the electrolyte 24 and its purpose is simply to improve the mechanical strength of the electrode;
or the electrode 1 previously described and shown in FIGS. 1 and 2.

In both cases, the principal faces 26 of these zinc electrodes 21, these faces being arranged on the side of the positive electrodes 23, have the same dimensions, namely of a square of a side about 6 cm, the surface of each face 26 being therefore about 36 $cm^2$.

(b) Positive electrodes 23

These identical electrodes are known silver electrodes of the Ag/AgO type. The theoretical capacity of each of these silver electrodes is substantially equal to the theoretical capacity of the zinc electrode 21 which is determined by the weight of zinc oxide, before the test, in this zinc electrode. The capacity of the generator 20 is therefore limited only by that of the zinc electrode which it contains.

(c) Electrolyte 24

This electrolyte is a 12 N aqueous potassium hydroxide solution (12 mols of KOH per liter), this solution being saturated with dissolved zinc oxide in the form of potassium zincate.

(d) Temperature of the generator 20 substantially ambient temperature, namely about 20° C.

EXAMPLE I

The separator 22 is formed of four layers of a film of regenerated cellulose of known type, the thickness of each layer being about 25 micrometers.

The charge-discharge cycles are carried out under the following conditions:
charge: total current 167 mA; the charging is stopped when the charge voltage reaches 2.05 V;
discharge: total current 2.5 A; the discharging is stopped when the discharge voltage reaches 1 V; every five cycles an additional discharge is effected in addition to the normal discharge; this additional discharge, effected with a total current of 250 mA, is stopped when the discharge voltage reaches 1 V.

The following table shows the capacity of the generator 20 as a function of the number of charge-discharge cycles. This capacity is expressed in percentage of the theoretical capacity of the zinc electrode used in the generator.

| No. of cycles | 1 | 10 | 20 | 30 | 40 |
|---|---|---|---|---|---|
| Generator with known zinc electrodes | 75% | 56.5% | 37.5% | 26.3% | 15% |
| Generator with zinc electrode in accordance with the invention | 100% | 97% | 77% | 63% | 55% |

There is thus noted a sudden decrease in the capacity of the generator 20 when it contains the known zinc electrode, this generator thus becoming unusable very rapidly.

On the other hand, when the generator 20 comprises the electrode 1 in accordance with the invention, its capacity decreases only slowly, since it is still equal to 55% after the 40th cycle and is stabilized starting with 90 cycles, this capacity being, for example, still equal to 42% after 140 cycles.

The observation of each zinc electrode at the end of the test shows that the zinc oxide is present only in the lower portion of the known electrode while it is present throughout the electrode in accordance with the invention with, it is true, a preferential concentration in the lower portion.

EXAMPLE II

The separator 22 is formed of four layers of a porous polypropylene film of known type having pores of oval section, the maximum and minimum average dimensions of these sections being about 0.2 micrometer and 0.04 micrometer, respectively; each layer has a thickness of about 25 micrometers and a porosity of about 45% by volume.

The charge and discharge cycles are carried out with the following conditions:
    charge: total current 500 mA;
    discharge: total current 2.5 A; after 44 and 58 cycles an additional discharge is effected in addition to the normal discharge, at a total current of 0.25 A.

The limitations with regard to the voltages are the same as those which have been described previously in connection with Example 1.

The generator 20 containing the known zinc electrode is unusable after four cycles as a result of the formation of dendrites.

In the case of the generator 20 containing the zinc electrode 1 in accordance with the invention, it is noted that its capacity after the first cycle is about 80% of theoretical capacity of the zinc electrode, this capacity of the generator 20 then remaining practically constant for the duration of the test, namely about 100 cycles.

The good performances of the zinc electrode 1 in accordance with the invention are due to the following characteristics.

The very porous structure of the electrode 1 makes it possible for it to become impregnated with a large amount of electrolyte so that the electrochemical reactions take place with zincate ions located within the zinc electrode 1 practically without there being any migration of zincate ions from the electrolyte located on the outside of said electrode. These reactions take place in particular from the surface of the conductive carbon fibers 4, the zinc produced upon each charge being capable possibly of depositing at least in part on the fibers 4 which are inert under the conditions of use of the generator 20. The substantially homogeneous dispersion of the fibers 4 and the zinc oxide particles 8 assures homogeneous operation of the electrode 1 throughout. The open porosity of the active portion of the electrodes in accordance with the invention varies preferably from 70% to 90% of the total volume of the active portion, this porosity being advantageously about 80% as in electrode 1. This porosity varies little during the charge-discharge cycles. It is preferable not to compress the electrodes in accordance with the invention excessively during their preparation in order not to impair this porosity.

In order to prevent zincate ions which come from the outside of the electrode 1 from participating in the electrochemical reactions it is preferable not to overcharge the electrode 1.

The fibers 4 can be formed of a material other than carbon, for example a metallic material which is inert under the conditions of use, but carbon has the advantage of substantially decreasing the weight of the electrode.

The average length of the fibers is preferably at least equal either to the thickness of the electrodes in accordance with the invention, or to the distance between each face of the electrode from the collector, when the latter is arranged within the electrode. The ratio between the average length of the fibers and their average diameter varies preferably from 50 to 1000, the average diameter of these fibers varying in particular from 5 to 30 micrometers and their average length varying in particular from 0.5 to 5 mm.

The nature of the binder may be any whatsoever, for example any polymeric organic material, any inorganic or metallic material, these materials, possibly in the form of mixtures, being inert under the conditions of use.

By way of example, when the binder is a polymeric organic material, this material may be a thermoplastic or elastomeric homopolymer or copolymer or a mixture of these polymers, in particular polyethylene, polypropylene or another polyolefin, polychloroprene, fluorinated polymer, in particular polytetrafluoroethylene. The electrode 1 may even not contain a binder, for example when the fibers 4, metallic or metallized on the surface, particularly of metallized carbon, are welded directly together for example by a thermal process such as a fritting operation. The use of an elastomeric binder which is inert in the electrolyte, such as polychloroprene is, however, preferable for it permits an elastic structure of the electrode 1 which makes it possible to compensate for possible variations in volume and shape of the active material.

When the electrode comprises carbon fibers and a binder, the dry weight of the binder expressed in percentage of the total weight of the active portion varies, for example, from 1% to 25% and preferably from 3% to 15%, while the weight of the carbon fibers, possibly metallized, expressed in percentage of the total weight of the active portion, varies, for example, from 2% to 25% and preferably from 3% to 15%, the rest of the active portion before the electrochemical charging of the electrode being formed, for example, of zinc oxide and/or hydroxide.

The current collector constituted by the copper wires 2 has the purpose only of assuring the drainage of the electronic charges away from the active portion or towards the active portion.

Any shape can be used for this collector, for example a sheet, whether perforated or not, an expanded blade or a grid.

This collector may be made of any electron conductive material which is inert in the electrolyte. It is preferable to use a material of high hydrogen over-voltage such as copper, cadmium, or material, for example iron, which is copper-plated or cadmium-plated. In this way, the corrosion of the electrode is avoided or limited.

One can contemplate eliminating the current collector when the fibers 4 are very conductive, for example, when they are of metallic material or of a metallized material, particularly when the fibers 4 are made with metallized carbon or a metallized inorganic or organic material.

It goes without saying that the generators employing the electrodes in accordance with the invention may have very different structures. Thus, for example, there may be only one positive electrode electrochemically associated with an electrode in accordance with the invention and the electrolyte may be different from the one cited in the examples.

On the other hand, the active material of the positive electrodes may be very different, these positive electrodes, for example, possibly being air or oxygen diffusion electrodes or nickel electrodes.

Of course the invention is not limited to the embodiments described above on the basis of which various other embodiments and methods can be contemplated without thereby going beyond the scope of the invention.

What is claimed is:

1. A zinc electrode designed to be used in a secondary generator comprising at least one active portion, characterized by the following features:
   (a) the active portion has an open porosity of at least 60% and comprises electron conductive fibers;
   (b) the active material in the discharged state, at least before the first charge, consists of zinc oxide particles which are distributed practically uniformly throughout the active portion;
   (c) the fibers are inert under the conditions of use;
   (d) the fibers have no preferential orientation and are assembled at least in part by bridges due to at least one elastomeric material, referred to as elastomeric binder, which is inert under the conditions of use; the fibers and the elastomeric binder thus forming an elastic and porous structure with voids located between the fibers and communicating with each other; and
   (e) the active material is arranged in the voids between the fibers.

2. The electrode according to claim 1, characterized by the fact that the open porosity varies from 70% to 90%.

3. The electrode according to claim 2, characterized by the fact that the open porosity is about 80%.

4. The electrode according to claim 1, characterized by the fact that the fibers are of carbon or of metallized carbon.

5. The electrode according to claim 4, characterized by the fact that the weight of the fibers, expressed in percentage of the total weight of the active portion, varies from 2% to 25%.

6. The electrode according to claim 4, characterized by the fact that the dry weight of the elastomeric binder, expressed in percentage of the total weight of the active portion, varies from 1% to 25%.

7. The electrode according to claim 1, characterized by the fact that said elastomeric material is a polychloroprene or contains a polychloroprene.

8. The electrode according to claim 1, characterized by the fact that the average length of the fibers is at least equal either to the thickness of the electrode or to the distance separating each face of the electrode from a collector arranged within the electrode.

9. The electrode according to claim 1, characterized by the fact that the ratio between the average length of the fibers and their average diameter varies from 50 to 1000.

10. An electrochemical generator of electric current employing at least one electrode in accordance with claim 1.

* * * * *